United States Patent
Byun (10) Patent No.: US 9,577,921 B2
(45) Date of Patent: Feb. 21, 2017

(54) MULTI-PATH COMMUNICATION DEVICE CAPABLE OF IMPROVING ENERGY USE EFFICIENCY AND TRAFFIC DISTRIBUTION METHOD FOR IMPROVING ENERGY USE EFFICIENCY THEREOF

(71) Applicant: Electronics and Telecommunications Research Institute, Daejeon (KR)

(72) Inventor: Sung-Hyuk Byun, Daejeon (KR)

(73) Assignee: ELECTRONICS AND TELECOMMUNICATIONS RESEARCH INSTITUTE, Yuseong-gu, Daejeon-si (KR)

( * ) Notice: Subject to any disclaimer, the term of this patent is extended or adjusted under 35 U.S.C. 154(b) by 0 days.

(21) Appl. No.: 14/434,967

(22) PCT Filed: Oct. 18, 2013

(86) PCT No.: PCT/KR2013/009334
§ 371 (c)(1),
(2) Date: Apr. 10, 2015

(87) PCT Pub. No.: WO2014/062028
PCT Pub. Date: Apr. 24, 2014

(65) Prior Publication Data
US 2015/0271061 A1    Sep. 24, 2015

(30) Foreign Application Priority Data

Oct. 19, 2012 (KR) .......... 10-2012-0116935
Jul. 16, 2013 (KR) .......... 10-2013-0083253

(51) Int. Cl.
*H04W 4/00* (2009.01)
*H04L 12/707* (2013.01)
(Continued)

(52) U.S. Cl.
CPC .......... *H04L 45/24* (2013.01); *H04L 41/0833* (2013.01); *H04L 43/0882* (2013.01);
(Continued)

(58) Field of Classification Search
USPC .............. 370/389, 503, 252, 321, 349, 351, 352,370/359, 406, 216, 225, 242, 254, 255, 388,370/397, 399, 445, 462, 466, 474, 509, 522,370/219, 253, 256, 327, 336, 341, 345, 369,370/386, 392, 395.62, 419, 441, 442, 463, 465,370/468, 470, 508, 510, 512; 709/240, 209, 709/231, 232, 236, 241, 248, 251, 252; 710/316
See application file for complete search history.

(56) References Cited

U.S. PATENT DOCUMENTS 7,463,579 B2    12/2008  Lapuh et al.
8,014,278 B1*   9/2011   Subramanian ...... H04L 12/2867
                                                    370/229
(Continued)

FOREIGN PATENT DOCUMENTS

KR    1020070075473 A    7/2007
KR    1020090083339 A    8/2009
(Continued)

*Primary Examiner* — Phuongchau Ba Nguyen
(74) *Attorney, Agent, or Firm* — William Park & Associates Ltd.

(57) ABSTRACT

The present invention relates to a multi-path communication device capable of improving energy use efficiency and a traffic distribution method for improving the energy use efficiency thereof, which can improve energy use efficiency of an entire network in multi-path communication by properly adjusting the number of paths for transmitting traffic according to traffic levels and distributing the traffic without distributing and transmitting the traffic to all possible paths.

16 Claims, 3 Drawing Sheets

(51) Int. Cl.
*H04L 12/24* (2006.01)
*H04L 12/26* (2006.01)
*H04L 12/743* (2013.01)
*H04L 12/729* (2013.01)
*H04L 12/851* (2013.01)
*H04L 12/803* (2013.01)

(52) U.S. Cl.
CPC ........ *H04L 45/125* (2013.01); *H04L 45/7453* (2013.01); *H04L 47/125* (2013.01); *H04L 47/24* (2013.01)

(56) References Cited

U.S. PATENT DOCUMENTS

| | | | |
|---|---|---|---|
| 8,499,093 B2 | 7/2013 | Grosser et al. | |
| 8,630,297 B2* | 1/2014 | Subramanian | H04L 45/125 370/242 |
| 8,660,036 B2 | 2/2014 | Kim et al. | |
| 8,724,456 B1* | 5/2014 | Hong | G06F 11/00 370/225 |
| 8,837,308 B2* | 9/2014 | Byun | H04L 12/12 370/252 |
| 8,942,085 B1* | 1/2015 | Pani | H04L 45/02 370/225 |
| 9,237,034 B2* | 1/2016 | Huang | G06F 11/2005 |
| 2005/0073958 A1* | 4/2005 | Atlas | H04L 45/00 370/238 |
| 2006/0133282 A1 | 6/2006 | Ramasamy | |
| 2010/0097926 A1* | 4/2010 | Huang | G06F 11/2005 370/219 |
| 2010/0124196 A1* | 5/2010 | Bonar | H04B 7/0689 370/329 |
| 2011/0103246 A1* | 5/2011 | Byun | H04L 12/12 370/252 |
| 2011/0283013 A1 | 11/2011 | Grosser et al. | |
| 2015/0271061 A1* | 9/2015 | Byun | H04L 47/125 370/392 |

FOREIGN PATENT DOCUMENTS

| | | |
|---|---|---|
| KR | 1020110049648 A | 5/2011 |
| KR | 1020120106312 A | 9/2012 |

* cited by examiner

MULTI-PATH COMMUNICATION DEVICE CAPABLE OF IMPROVING ENERGY USE EFFICIENCY AND TRAFFIC DISTRIBUTION METHOD FOR IMPROVING ENERGY USE EFFICIENCY THEREOF

TECHNICAL FIELD

The present invention relates to multi-path communication technology, and more particularly, to a multi-path communication apparatus capable of improving energy efficiency and a traffic distribution method of improving energy efficiency thereof.

BACKGROUND ART

In general, traffic is transmitted by selecting an optimal path having low path costs between two nodes in a communication network. When there are a plurality of optimal paths having the same cost, multi-path communication methods use the plurality of optimal paths to transmit traffic rather than selecting only one path.

As a representative example, there is a Multi-chassis LAG in which a link aggregation group (LAG) according to an IEEE 802.3ad standard that defines a link group between two nodes is extended to multiple nodes and the link group can connect with two or more adjacent nodes. U.S. Pat. No. 7,463,579 (2008 Dec. 9) discloses technology for setting LAG to two or more adjacent nodes.

There is an equal-cost multi-path (ECMP) function in an L3 routing protocol such as Open Shortest Path First (OSPF) and Intermediate System to Intermediate System (IS-IS). A Trill (spanning tree protocol), which is a protocol for efficiently building a large scale L2 network without a STP, also supports the ECMP.

A principle of such a multi-path communication is that traffic is equally transmitted to multiple paths in a distributed manner. This is for efficiently using network resources. However, under such a traffic load balancing principle, since traffic is transmitted to all paths even when the amount of traffic is small, there is room for improvement under current situations in which energy efficiency of an entire network is also important.

Technical Problem

The invention has been made in view of aforementioned problems, and the invention provides a multi-path communication apparatus that can improve energy efficiency of an entire network in multi-path communication such that traffic is not transmitted to all available paths but is distributed by appropriately adjusting the number of paths to which traffic is transmitted based on a traffic level, and a traffic distribution method of improving energy efficiency thereof.

Technical Solution

In one general aspect, there is provided a multi-path communication apparatus capable of improving energy efficiency including, a plurality of physical links, a processor configured to select two or more physical links, that are included in an equal-cost multi-path for each packet destination, from among the plurality of physical links as path-links, generate and manage at least one destination-specific multi-path link group that includes the selected path-links as group members, and select path-links to which traffic is transmitted in a distributed manner from the destination-specific multi-path link group based on a traffic level of the destination-specific multi-path link group, a traffic meter configured to measure a traffic level of path-links included in the destination-specific multi-path link group managed by the processor, and a traffic splitter configured to distribute and transmit traffic heading for a destination of a corresponding multi-path link group to the path-links selected by the processor.

The processor may manage each path-link as an active path-link or idle path-link based on a priority of each path-link included in the destination-specific multi-path link group.

The priority of each of the path-links may include a node priority of an adjacent node connected to a corresponding path-link and a link priority of a physical link corresponding to a corresponding path-link.

The processor may select active path-links based on the node priority, and when two or more path-links are connected to the same adjacent node, the processor may select active path-links based on a link priority of a physical link corresponding to each path-link connected to the same adjacent node.

The node priority may be determined by a router ID used in a routing protocol. The link priority may be determined by a port number or link layer address of the physical link corresponding to the path-link.

When it is determined that the number of active path-links of the multi-path link group is too large for the traffic level of the multi-path link group, the processor may switch some active path-links to idle path-links based on the priority of path-links included in the multi-path link group.

When it is determined that the number of active path-links of the multi-path link group is too small for the traffic level of the multi-path link group, the processor may switch some idle path-links to active path-links based on the priority of path-links included in the multi-path link group.

When one physical link is selected as a path-link of each multi-path link group for a plurality of multi-path link groups, the processor may designate a corresponding physical link as an active path-link or idle path-link independently for each multi-path link group.

The traffic meter may monitor the amount of traffic of path-links included in the destination-specific multi-path link group managed by the processor, and determine an average traffic load of active path-links included in the destination-specific multi-path link group as a traffic level of a corresponding multi-path link group.

The traffic meter may respectively compare the traffic level of the multi-path link group with an upper threshold and a lower threshold, and determine whether the number of active path-links of the multi-path link group is too large or too small for the traffic level of the multi-path link group.

When the traffic level of the multi-path link group is greater than the upper threshold, the traffic meter may provide a notification that the number of active path-links of the multi-path link group is determined as being too small for the traffic level to the processor.

When the traffic level of the multi-path link group is lower than the lower threshold, the traffic meter may provide a notification that the number of active path-links of the multi-path link group is determined as being too large for the traffic level to the processor.

When it is determined as a new packet flow based on a hashing result of header information of the traffic packets, the traffic splitter may allocate and distribute packets included in the new packet flow to a path-link having lower amount of traffic.

The apparatus may be implemented in a in a hardware type constituting some or all components of a wired or wireless host, some or all components of a switch, or some or all components of a router included in a multi-path communication system.

In another aspect, there is provided a traffic distribution method of improving energy efficiency of a multi-path communication apparatus, including, selecting two or more physical links included in an equal-cost multi-path as path-links for each destination, and generating at least one destination-specific multi-path link group that includes the selected path-links as group members, setting each path-link as an active path-link or idle path-link based on a priority of each path-link included in the destination-specific multi-path link group generated in the multi-path link group generating operation and initializing the path-link, measuring a traffic level of path-links included in the destination-specific multi-path link group, selecting active path-links to which traffic is transmitted in a distributed manner from among path-links of a corresponding destination-specific multi-path link group based on the traffic level of the destination-specific multi-path link group measured in the traffic measuring operation, and distributing and transmitting traffic to be transmitted to a corresponding destination to active path-links selected in the active path-link selecting operation.

Advantageous Effects

According to the invention, traffic is not transmitted to all available paths in a distributed manner but is distributed such that the number of paths to which traffic is transmitted is appropriately adjusted based on the traffic level. Therefore, when the amount of traffic is small, all available paths are not used but some paths are used to transmit traffic. On the other hand, when the amount of traffic is large, unused paths are added to transmit traffic. As a result, it is possible to improve energy efficiency of the entire network.

MODE FOR INVENTION

Hereinafter, in order to facilitate understanding and embodiment by those skilled in the art, the present invention will be described in detail by explaining exemplary embodiments with reference to the accompanying drawings.

When it is deemed that detailed descriptions of related well-known functions and configurations might obscure the subject matter of the embodiments, those detailed descriptions will be omitted.

Some terms used herein are defined by considering functions in the embodiments, and meanings may vary depending on, for example, a user or operator's intentions or customs. Therefore, the meanings of terms used in the embodiments should be interpreted based on the contents throughout this specification.

Before describing the invention, multi-path communication used in this specification refers to a communication method that efficiently uses a network such that traffic is transmitted to output links of all optimal paths in a distributed manner when there are two or more optimal paths (for example, paths having the same, minimum cost) having a different output link among paths from a specific node to a specific destination.

Representative examples may include Multi-chassis-LAG (MC-LAG) configuring one link group with two or more adjacent nodes, which developed from an IEEE 802.3ad Link Aggregation Group (LAG) standard, and Equal-Cost Multi-path (ECMP) supported in an L3 routing protocol such as Open Shortest Path First (OSPF) or Intermediate System to Intermediate System (IS-IS), and ECMP technology in Trill for building a large scale L2 network in, for example, a data center, without Spanning Tree Protocol (STP). In addition, all packet forwarding technology matching definition of the above multi-path communication may be included.

A multi-path communication apparatus capable of improving energy efficiency according to the invention may be implemented in a hardware type constituting some or all network nodes including a wired or wireless host, a switch, or a router included in a multi-path communication system.

Figure 1:
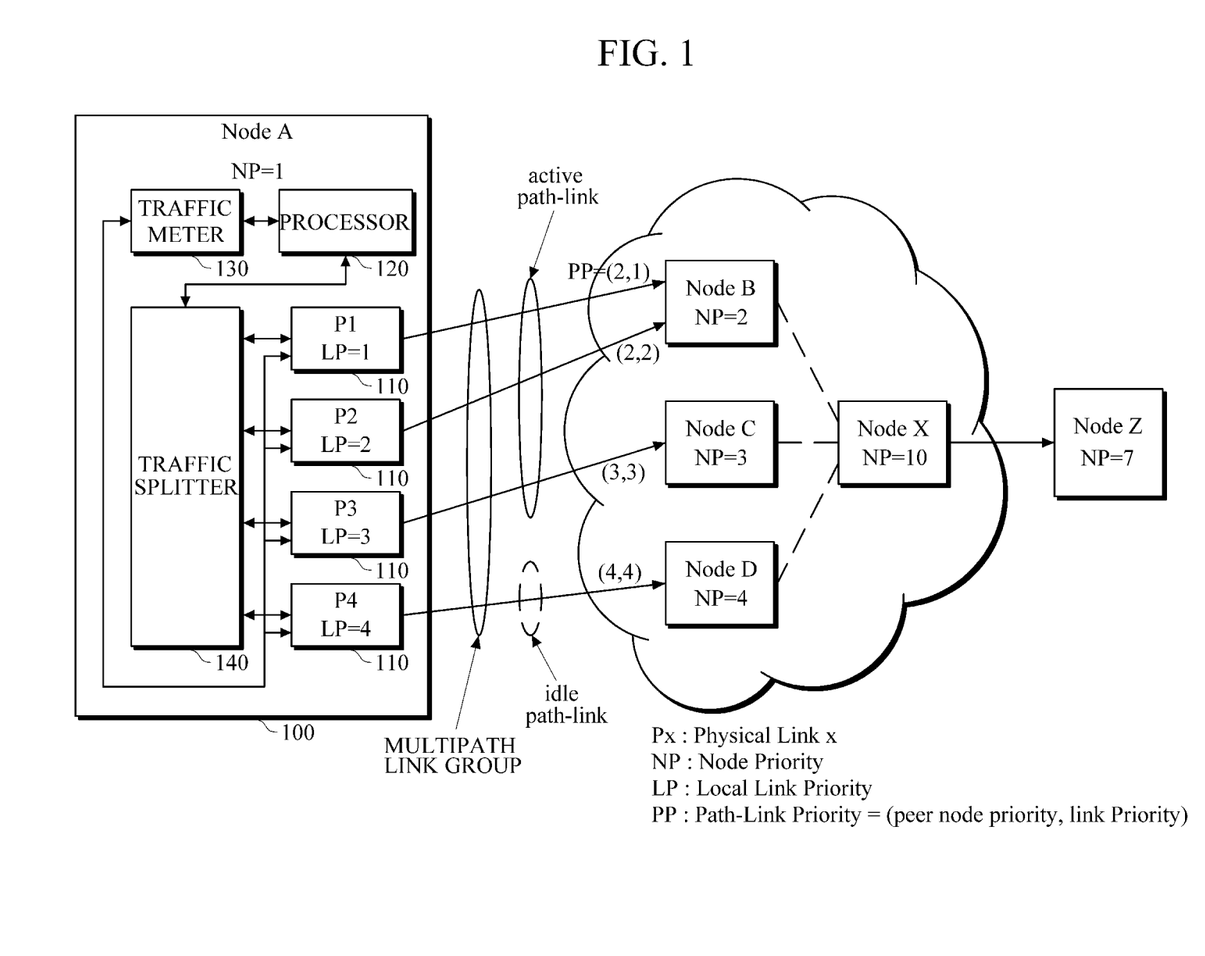
FIG. 1 is a block diagram illustrating a configuration of a multi-path communication apparatus capable of improving energy efficiency according to an embodiment of the invention.

FIG. 1 is a block diagram illustrating a configuration of a multi-path communication apparatus capable of improving energy efficiency according to an embodiment of the invention. As illustrated in FIG. 1, a multi-path communication apparatus 100 capable of improving energy efficiency according to the embodiment includes a plurality of physical links 110, a processor 120, a traffic meter 130, and a traffic splitter 140.

The physical link 110 is a hardware component configured to physically communicate with an adjacent node in a multi-path communication system. The physical link 110 may be an arbitrary wired and/or wireless communication link, and may be one of interfaces, for example, an Ethernet, a passive optical network (PON), a Packet over Sonet (POS), a wireless LAN, code division multiple access (CDMA), and Global System for Mobile communications (GSM).

The processor 120 selects two or more physical links, that are included in an equal-cost multi-path for each packet destination, from among the plurality of physical links 110 as path-links, generates and manages at least one destination-specific multi-path link group that includes the selected path-links as group members, and selects path-links to which traffic is transmitted in a distributed manner from the destination-specific multi-path link group based on a traffic level of the destination-specific multi-path link group.

The processor 120 may select, for example, two or more physical links having minimum path costs as path-links. Meanwhile, when the processor 120 selects one physical link as a path-link of each multi-path link group for a plurality of multi-path link groups, a corresponding physical link may be designated as an active path-link or idle path-link independently for each multi-path link group.

Meanwhile, based on a priority of each path-link included in the destination-specific multi-path link group, the processor 120 may manage each path-link as an active path-link or idle path-link. In this case, the active path-link refers to a physical link set to deliver traffic heading for a destination of a corresponding multi-path link group, and the idle path-link is a physical link set not to deliver traffic heading for a destination of a corresponding multi-path link group.

The priority of each path-link may include, for example, a node priority of an adjacent node connected to a corresponding path-link and a link priority of a physical link corresponding to a corresponding path-link. In this case, the processor 120 may select the active path-link based on the node priority, and when two or more path-links are connected to the same adjacent node, the active path-link may be selected based on a link priority of a physical link corresponding to each path-link connected to the same adjacent node.

As illustrated in FIG. 1, a specific multi-path link group includes path-links of physical links P1, P2, P3, and P4. Based on the priority of the path-link, the path-links communicating with P1, P2, and P3 are selected as the active path-links and the path-link communicating with P4 is selected as the idle path-link.

Meanwhile, as the node priority, a value that is appropriately set by a network administrator may be used, other system parameters that are already set in a node, that is, a router ID used in a routing protocol such as OSPF or IS-IS, may be used, or a value using various system parameters such as an IP address of a management interface may also be used.

Each communication node in a network may have a unique node priority or non-unique node priority. When each communication node is set to have a unique node priority, since it is easy to concentrate traffic on a specific transit node, it is highly likely to make the physical link and remaining transit communication nodes in an idle state.

Meanwhile, as the link priority, a value that is set by an operator may be used, or a value using other parameters assigned to a corresponding link, that is, various system parameters such as a port number or a link layer address, may be used.

In order not to transmit traffic to all available paths in a distributed manner but to distribute traffic by appropriately adjusting the number of paths to which traffic is transmitted, when it is determined that the number of active path-links of the specific multi-path link group is too large for the traffic level of a corresponding multi-path link group, the processor 120 may switch some active path-links to idle path-links based on the priority of path-links included in the corresponding multi-path link group.

On the other hand, when it is determined that the number of active path-links of the specific multi-path link group is too small for the traffic level of the corresponding multi-path link group, the processor 120 may switch some idle path-links to active path-links based on the priority of path-links included in the corresponding multi-path link group.

Therefore, the processor 120 adjusts actively a path-link state of the multi-path link group such that when the amount of traffic is small, traffic is transmitted to some paths rather than all available paths, and when the amount of traffic is large, traffic is transmitted by adding unused paths. And by using a proper priority allocation policy to path-links, traffic is transmitted to only some physical links based on the amount of traffic. In this way, it is possible to improve energy efficiency of an entire network.

The traffic meter 130 measures traffic levels of path-links included in a destination-specific multi-path link group that is managed by the processor 120. For example, the traffic meter 130 may monitor the amount of traffic of the path-links included in the destination-specific multi-path link group managed by the processor 120, and may determine an average traffic load of active path-links included in the destination-specific multi-path link group as a traffic level of a corresponding multi-path link group.

Meanwhile, the traffic meter 130 may respectively compare the traffic level of the multi-path link group with an upper threshold and a lower threshold, and may determine whether the number of active path-links of the multi-path link group is too large or too small for the traffic level of the corresponding multi-path link group.

When the traffic level of the multi-path link group is greater than the upper threshold, the traffic meter 130 may provide a notification that the number of active path-links of the multi-path link group is determined as being too small for the traffic level to the processor 120.

On the other hand, when the traffic level of the multi-path link group is lower than the lower threshold, the traffic meter 130 may provide a notification that the number of active path-links of the multi-path link group is determined as being too large for the traffic level to the processor 120.

Therefore, according to the notification from the traffic meter 130, the processor 120 may determine whether the number of active path-links of the multi-path link group is too large for the traffic level or not. Depending on whether the number of active path-links of the multi-path link group is too large for the traffic level or not, the number of active path-links and idle path-links is adjusted so that it is possible to improve energy efficiency of the entire network.

The traffic splitter 140 distributes and transmits traffic to path-links that are selected by the processor 120 as active path-links to which traffic is transmitted in a distributed manner. In this case, the traffic splitter 140 may perform hashing on header information of traffic packets. Based on a hashing result, traffic may be distributed to the path-links selected by the processor 120.

For example, based on the hashing result of header information of the traffic packets, the traffic splitter 140 may distribute traffic such that packets determined as being included in the same flow are distributed to a specific path-link and therefore a sequence of packets included in the same flow is not changed.

For example, when it is determined as a new packet flow based on the hashing result of header information of the traffic packets, the traffic splitter 140 may also allocate and distribute packets included in the new packet flow to a path-link having lower amount of traffic.

In this way, according to the invention, traffic is not transmitted to all available paths in a distributed manner but is distributed such that the number of paths to which traffic is transmitted is appropriately adjusted based on the traffic level. Therefore, when the amount of traffic is small, all available paths are not used but some paths are used to transmit traffic. On the other hand, when the amount of traffic is large, unused paths are added to transmit traffic. As a result, it is possible to improve energy efficiency of the entire network.

Figure 2:
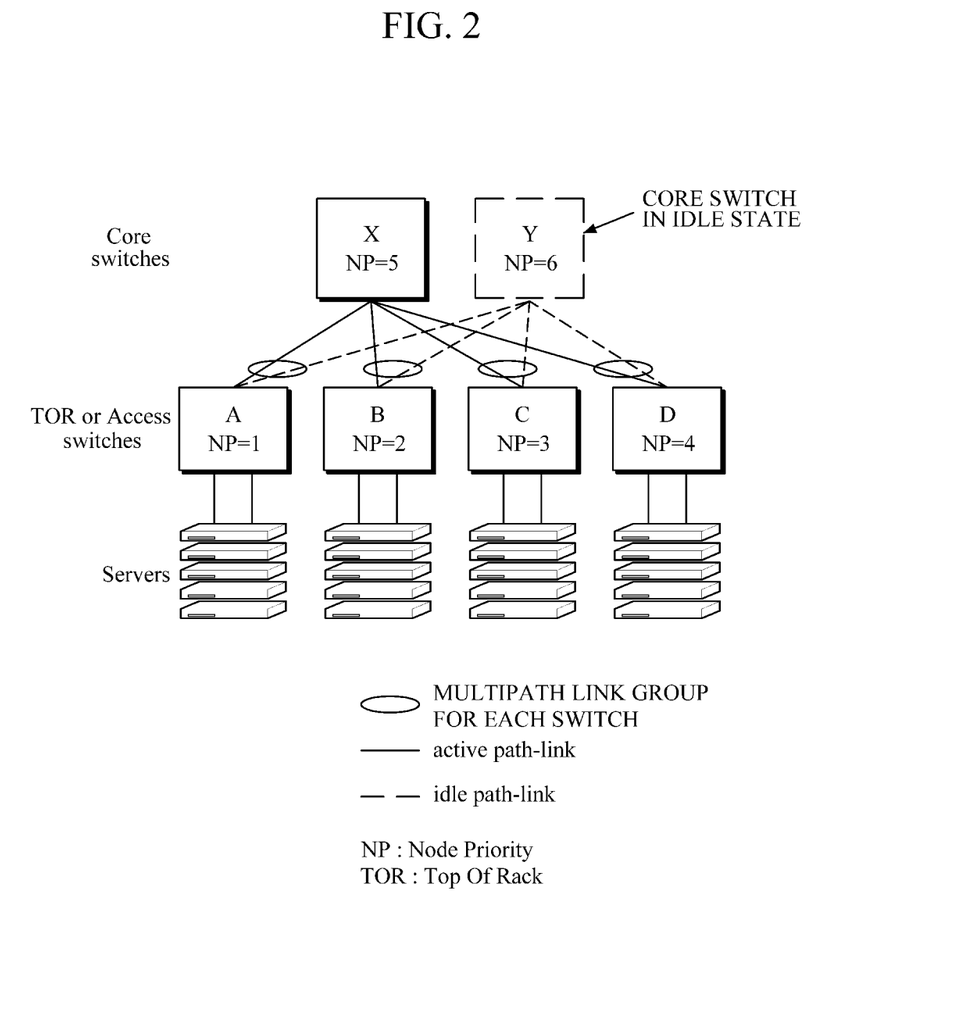
FIG. 2 is a diagram illustrating an exemplary multi-path communication apparatus capable of improving energy efficiency that is applied to a communication network having a symmetric structure according to an embodiment of the invention.

FIG. 2 is a diagram illustrating an exemplary multi-path communication apparatus capable of improving energy efficiency that is applied to a communication network having a symmetric structure according to an embodiment of the invention. As illustrated in FIG. 2, in a data center or enterprise network, in general, servers are connected to a top of rack (TOR) switch or an access switch, and core switches of one or two layers are symmetrically connected for linking with the TOR switch or access switch.

In FIG. 2, in a TOR switch or access switch A to which the multi-path communication apparatus capable of improving energy efficiency according to the invention is applied, optimal paths up to destinations B, C, and D are two (through core switch X and core switch Y), and a multi-path link group is respectively formed for each destination B, C, and D. Since a node priority (NP=5) of a core switch X is greater than a node priority (NP=6) of a core switch Y, all multi-path link groups in the TOR switch or access switch A are set such that path-links connected to the core switch X are set as active path-links and path-links connected to the core switch Y are set as idle path-links, when traffic level is quite low.

Therefore, when a traffic level of multi-path link groups for each destination B, C, and D is low in the TOR switch or access switch A, traffic is concentrated on only the core switch X, but is not transmitted to the core switch Y.

Meanwhile, even when an access switch B, C, or D transmits traffic to remaining access switches, under the same principle, traffic is concentrated on only the core switch X but is not transmitted to the core switch Y when the traffic level thereof is low. As a result, a half of a core network enters an idle state so that it is possible to maximize network energy saving.

On the other hand, when the traffic level of multi-path link groups for each destination B, C, and D is high in the TOR switch or access switch A, a path-link connected to the core switch Y is switched to the active path-link, traffic is distributed to both of the core switches X and Y, and an entire core network enters an active state. So it is possible to actively improve network energy efficiency adapting to the dynamic traffic load variation.

Figure 3:
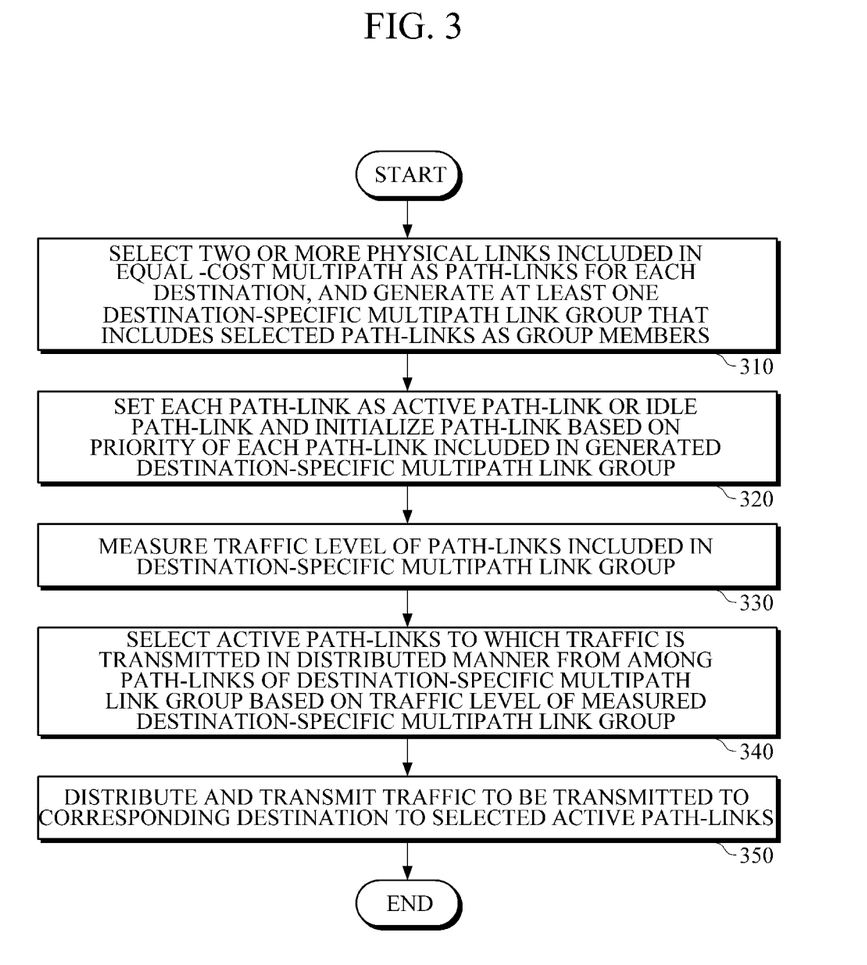
FIG. 3 is a flowchart illustrating a traffic distribution method of improving energy efficiency of the multi-path communication apparatus capable of improving energy efficiency according to the embodiment of the invention.

Traffic distribution operations for improving energy efficiency of the above-described multi-path communication apparatus capable of improving energy efficiency according to the invention will be described with reference to FIG. 3. FIG. 3 is a flowchart illustrating a traffic distribution method of improving energy efficiency of the multi-path communication apparatus capable of improving energy efficiency according to the embodiment of the invention.

First, in multi-path link group generating operation (310), the multi-path communication apparatus selects two or more physical links included in an equal-cost multi-path as path-links for each destination, and generates at least one destination-specific multi-path link group that includes the selected path-links as group members. In this case, in the multi-path link group generating operation (310), the multi-path communication apparatus may select two or more physical links having minimum path costs as path-links.

Subsequently, in multi-path link group initializing operation (320), based on a priority of each path-link included in the destination-specific multi-path link group generated in the multi-path link group generating operation (310), the multi-path communication apparatus sets each path-link as an active path-link or idle path-link and initializes the path-link.

In this case, in the multi-path link group initializing operation (320), when one physical link is selected as a path-link of each multi-path link group for a plurality of multi-path link groups, the multi-path communication apparatus may also designate a corresponding physical link as an active path-link or idle path-link independently for each multi-path link group.

Meanwhile, the priority of each path-link may include a node priority of an adjacent node connected to a corresponding path-link and a link priority of a physical link corresponding to a corresponding path-link.

In the multi-path link group initializing operation (320), for example, the multi-path communication apparatus may set active path-links based on the node priority, and when two or more path-links are connected to the same adjacent node, the active path-link may be set based on a link priority of a physical link corresponding to each path-link connected to the same adjacent node.

In this case, the node priority may be determined by a router ID used in a routing protocol, and the link priority may be determined by a port number of a port number or link layer address of a physical link corresponding to the path-link.

Subsequently, in traffic measuring operation (330), the multi-path communication apparatus measures a traffic level of path-links included in the destination-specific multi-path link group. In this case, in the traffic measuring operation (330), the multi-path communication apparatus may monitor the amount of traffic of path-links included in the destination-specific multi-path link group, and determine an average traffic load of active path-links included in the destination-specific multi-path link group as a traffic level of a corresponding multi-path link group.

Meanwhile, in the traffic measuring operation (330), the multi-path communication apparatus may respectively compare the traffic level of the multi-path link group with an upper threshold and a lower threshold, and may determine whether the number of active path-links of the multi-path link group is too large for the traffic level of the corresponding multi-path link group.

In the traffic measuring operation (330), when the traffic level of the multi-path link group is greater than the upper threshold, the multi-path communication apparatus may determine that the number of active path-links of the multi-path link group is too small for the traffic level.

On the other hand, in the traffic measuring operation (330), when the traffic level of the multi-path link group is lower than the lower threshold, the multi-path communication apparatus may determine that the number of active path-links of the multi-path link group is too large for the traffic level.

Next, in active path-link selecting operation (340), based on the traffic level of the destination-specific multi-path link group measured in the traffic measuring operation (330), the multi-path communication apparatus may select active path-links to which traffic is transmitted in a distributed manner from among path-links of the corresponding destination-specific multi-path link group.

In this case, in the active path-link selecting operation (340), the multi-path communication apparatus may determine whether the number of active path-links of the multi-path link group is too large or not for the traffic level and adjust the number of active path-links and idle path-links.

In the active path-link selecting operation (340), for example, when it is determined that the number of active path-links of the multi-path link group is too large for the traffic level, the multi-path communication apparatus may switch some active path-links to idle path-links based on the priority of path-links included in the corresponding multi-path link group.

On the other hand, in the active path-link selecting operation (340), when it is determined that the number of active path-links of the multi-path link group is too small for the traffic level, the multi-path communication apparatus may switch some idle path-links to active path-links based on the priority of path-links included in the corresponding multi-path link group.

Subsequently, in traffic distributing operation (350), the multi-path communication apparatus distributes and transmits traffic to be transmitted to a corresponding destination to active path-links selected in the active path-link selecting operation (340).

In this case, in the traffic distributing operation (350), the multi-path communication apparatus may perform hashing on header information of traffic packets, and distribute traffic to path-links selected in the active path-link selecting operation (340) based on a hashing result.

Meanwhile, in the traffic distributing operation (350), when it is determined as being included in the same flow based on the hashing result of header information of the traffic packets, the multi-path communication apparatus may distribute traffic such that packets determined as being included in the same flow are distributed to a specific path-link and therefore a sequence of packets included in the same flow is not changed.

Meanwhile, in the traffic distributing operation (350), when it is determined as a new flow based on the hashing result of header information of the traffic packets, the multi-path communication apparatus may allocate and distribute packets included in the new packet flow to a path-link having lower amount of traffic.

In this way, according to the invention, traffic is not transmitted to all available paths in a distributed manner but is distributed such that the number of paths to which traffic is transmitted is appropriately adjusted based on the traffic level. Therefore, when the amount of traffic is small, all available paths are not used but some paths are used to transmit traffic. On the other hand, when the amount of traffic is large, unused paths are added to transmit traffic. As a result, it is possible to improve energy efficiency of the entire network and to achieve the above-described purpose of the invention.

While the invention has been described with reference to exemplary embodiments illustrated in accompanying drawings, it is apparent that all modifications and equivalents that fall within the scope of the appended claims can be made.

The present invention can be implemented as computer-readable codes in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A multi-path communication apparatus comprising:
   a processor configured to:
   select, as path-links to a plurality of nodes, a plurality of physical links that are included in an equal-cost multi-path;
   including the selected path-links as group members in a destination-specific multi-path link group;
   manage each path-link in the group as an active path-link or an idle path-link, where active path-links are path-links through which traffic is transmitted in a distributed manner from the group;
   dynamically adjust a number of active path-links, including those path-links to the same single node and across different nodes, in accordance with a measured traffic level of the group;
   a traffic meter configured to measure a traffic level of path-links included in the group managed by the processor; and
   a traffic splitter configured to distribute and transmit traffic heading for a destination of a corresponding group to the path-links selected by the processor.

2. The apparatus according to claim 1, wherein the processor selects each path-link in the group as an active path-link or an idle path-link in order of a priority of each path-link included in the group.

3. The apparatus according to claim 2, wherein the priority of each of the path-links includes a node priority of an adjacent node connected to a corresponding path-link and a link priority of a physical link corresponding to a corresponding path-link.

4. The apparatus according to claim 3, wherein the processor selects active path-links based on the node priority, and when two or more path-links are connected to the same adjacent node, the processor selects active path-links based on a link priority of a physical link corresponding to each path-link connected to the same adjacent node.

5. The apparatus according to claim 3, wherein the node priority is determined by a router ID used in a routing protocol.

6. The apparatus according to claim 3, wherein the link priority is determined by a port number or link layer address of the physical link corresponding to the path-link.

7. The apparatus according to claim 3, wherein, when it is determined that the number of active path-links of the multi-path link group is too large for the traffic level of the multi-path link group, the processor switches some active path-links to idle path-links based on the priority of path-links included in the multi-path link group.

8. The apparatus according to claim 3, wherein, when it is determined that the number of active path-links of the multi-path link group is too small for the traffic level of the multi-path link group, the processor switches some idle path-links to active path-links based on the priority of path-links included in the multi-path link group.

9. The apparatus according to claim 2, wherein, when one physical link is selected as a path-link of each multi-path link group for a plurality of multi-path link groups, the processor designates a corresponding physical link as an active path-link or idle path-link independently for each multi-path link group.

10. The apparatus according to claim 2, wherein the traffic meter monitors the amount of traffic of path-links included in the destination-specific multi-path link group managed by the processor, and determines an average traffic load of active path-links included in the destination-specific multi-path link group as a traffic level of a corresponding multi-path link group.

11. The apparatus according to claim 10, wherein the traffic meter respectively compares the traffic level of the multi-path link group with an upper threshold and a lower threshold, and determines whether the number of active path-links of the multi-path link group is too large or too small for the traffic level of the multi-path link group.

12. The apparatus according to claim 11, wherein, when the traffic level of the multi-path link group is greater than the upper threshold, the traffic meter provides a notification that the number of active path-links of the multi-path link group is determined as being too small for the traffic level to the processor.

13. The apparatus according to claim 11, wherein, when the traffic level of the multi-path link group is lower than the lower threshold, the traffic meter provides a notification that the number of active path-links of the multi-path link group is determined as being too large for the traffic level to the processor.

14. The apparatus according to claim 10, wherein, when it is determined as a new packet flow based on a hashing result of header information of the traffic packets, the traffic splitter allocates and distributes packets included in the new packet flow to a path-link having lower amount of traffic.

15. The apparatus according to claim 1, wherein the apparatus is implemented in a hardware type constituting some or all components of a wired or wireless host, some or all components of a switch, or some or all components of a router included in a multi-path communication system.

16. A traffic distribution method of a multi-path communication apparatus, the method comprising:

selecting, as path-links to a plurality of nodes, a plurality of physical links included in an equal-cost multi-path, the selected path-links including two or more path-links to a single node;

generating at least one destination-specific multi-path link group that includes the selected path-links as group members;

setting each path-link as an active path-link or an idle path-link based on a priority of each path-link included in the destination-specific multi-path link group, where active path-links are path-links through which traffic is transmitted in a distributed manner from the destination-specific multi-path link group;

measuring a traffic level of path-links included in the destination-specific multi-path link group;

dynamically adjusting a number of active path-links, including those path-links to the same single node and across different nodes, in accordance with the measured traffic level; and distributing traffic for transmission to a corresponding destination over the adjusted active path-links.

\* \* \* \* \*